United States Patent
Yu et al.

(10) Patent No.: US 8,761,612 B2
(45) Date of Patent: Jun. 24, 2014

(54) 16 QUADRATURE AMPLITUDE MODULATION OPTICAL SIGNAL TRANSMITTER

(75) Inventors: Jianjun Yu, Princeton, NJ (US); Ting Wang, West Windsor, NJ (US); Dayou Qian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 512 days.

(21) Appl. No.: 12/562,260

(22) Filed: Sep. 18, 2009

(65) Prior Publication Data

US 2010/0329696 A1  Dec. 30, 2010

Related U.S. Application Data

(60) Provisional application No. 61/219,882, filed on Jun. 24, 2009.

(51) Int. Cl.
*H04B 10/00* (2013.01)
(52) U.S. Cl.
USPC .......................................................... 398/188
(58) Field of Classification Search
USPC .......................................................... 398/188
See application file for complete search history.

(56) References Cited

U.S. PATENT DOCUMENTS

| 4,975,635 | A | * | 12/1990 | Takahashi et al. | ............... 324/96 |
| 2003/0002118 | A1 | * | 1/2003 | Givehchi | ........................ 359/181 |
| 2009/0185810 | A1 | * | 7/2009 | Kaplan et al. | .................. 398/184 |
| 2009/0269080 | A1 | * | 10/2009 | Akiyam et al. | ............... 398/188 |

OTHER PUBLICATIONS

Winzer, P.J. et al., "112-Gb/s Polarization-Multiplexed 16-QAM on a 25-GHz WDM Grid", ECOC 2008, Sep. 21-25, 2008, Brussels, Belgium.

* cited by examiner

*Primary Examiner* — Danny Leung
(74) *Attorney, Agent, or Firm* — Joseph Kolodka

(57) ABSTRACT

An optical transmitter includes a dividing optical coupler, a first optical modulator driven by an I component of a first signal and a I component of a second signal for modulating a lightwave, a DC bias of the first optical, a second optical modulator driven by a Q component of the first signal and a Q component of the second signal for modulating a lightwave, a DC bias of the second optical modulator, a phase shifter, and a combining optical coupler for combining the modulated lightwave from the first optical coupler and the phase shifted Q components of the first and second signals for generating a quadrature amplitude modulated signal.

10 Claims, 1 Drawing Sheet

16 QUADRATURE AMPLITUDE MODULATION OPTICAL SIGNAL TRANSMITTER

This application claims the benefit of U.S. Provisional Application No. 61/219,882, entitled "16QAM Optical Signal Generation", filed on Jun. 24, 2009, the content of which is incorporated by reference herein.

BACKGROUND OF THE INVENTION

The present invention relates generally to optical systems, and more particularly, to generation of 16 quadrature amplitude modulation QAM optical signal generation.

It is well known that a higher level modulation format can be used to increase the spectral efficiency of communications. Current signal modulation development has attained a 64-level quadrature amplitude modulation. However, transmitters for such high level QAM are very complicated and difficult to implement.

Accordingly, there is a need for a new technique for generating 16QAM optical signals that can be more easily implemented with a less complicated transmitter configuration than heretofore.

SUMMARY OF THE INVENTION

In accordance with the invention, there is provided an optical transmitter including a dividing optical coupler for dividing a lightwave onto optical paths; a first optical modulator in a first of the optical paths and driven by an I component of a first signal and a I component of a second signal for modulating the lightwave, a DC bias of the first optical modulator being at a quadrature point; a second optical modulator in a second of the optical paths and driven by a Q component of the first signal and a Q component of the second signal for modulating the lightwave, a DC bias of the second optical modulator being at the quadrature point; a phase shifter for generating a 90 degree phase shift in the Q components of the first and second signals that are modulated by the second optical coupler; and a combining optical coupler for combining the modulated lightwave from the first optical coupler and the phase shifted Q components of the first and second signals for generating a quadrature amplitude modulated signal.

In an alternative aspect of the invention, a method for generating an optical signal includes dividing a lightwave onto optical paths; modulating the lightwave on a first of the optical paths responsive to an I component of a first signal and a I component of a second signal, a DC biasing of the modulating of the I components being at a quadrature point; modulating the lightwave on a second of the optical paths responsive to a Q component of the first signal and a Q component of the second signal, a DC biasing of the Q components being at the quadrature point; generating a 90 degree phase shift in the modulated Q components; and combining the modulated I components and the phase shifted Q components for generating a quadrature amplitude modulated signal.

In a preferred embodiment, at least one of the amplitude of the I component of the first signal is half the amplitude of the I component of the second signal plus the amplitude of the Q component of the first signal is half the amplitude of the Q component of the second signal and the amplitude of the I component of the second signal is half the amplitude of the I component of the first signal plus the amplitude of the Q component of the second signal is half the amplitude of the Q component of the first signal. Preferably, the voltage value of the I components of the first and second signals is smaller than a half wave voltage of its respective optical modulator. Preferably, for 100 Gbit/s16QAM signal generation out of the combining optical coupler the bit rate for the I and Q components each is 25 Gbit/s. Preferably, at least one of the I components the Q components are synchronized in a time domain. Preferably, the phase shifter generates an optical ray length of approximately one quarter of 1550 nm if the lightwave has a wavelength of near 1550 nm. Preferably, the modulators are dual arm modulators being one of a LiNbO3 mach-Zehnder modulator and a InP mach-Zehnder modulator. Alternatively, the modulators are single arm modulators each receiving output from respective power couplers, each of the power couplers combining a respective pair of I components and pair of Q components.

BRIEF DESCRIPTION OF DRAWINGS

These and other advantages of the invention will be apparent to those of ordinary skill in the art by reference to the following detailed description and the accompanying drawings.

DETAILED DESCRIPTION

The invention is directed to a transmitter for generating a 16QAM optical signal using optical components.

Figure 1:
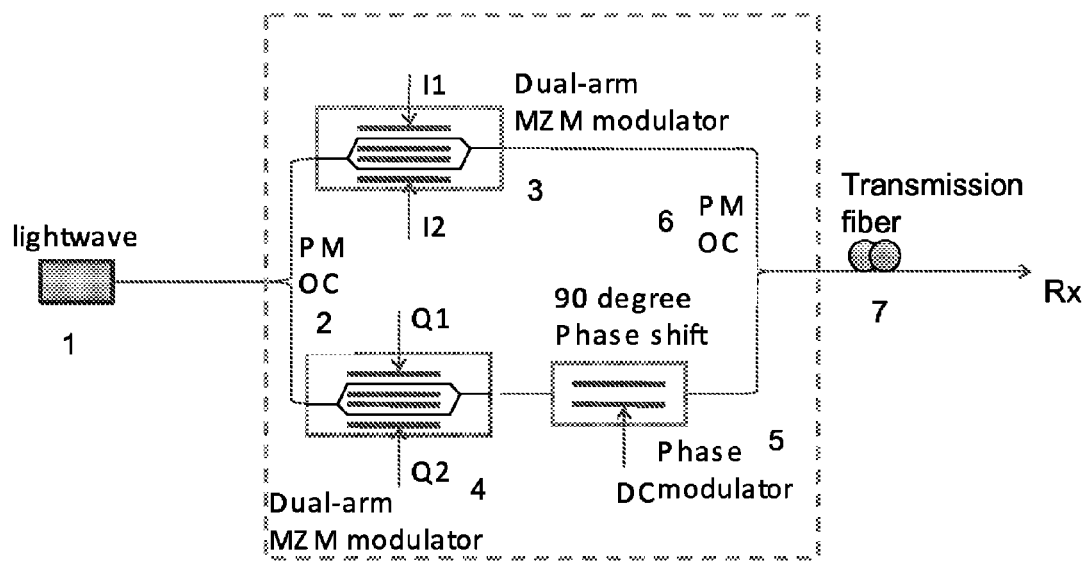
FIG. 1 is a schematic diagram of a transmitter generating a 16QAM optical signal, employing dual arm modulators, in accordance with the invention.

FIG. 1 is a schematic diagram of a transmitter generating a 16QAM optical signal, employing dual arm modulators, in accordance with the invention. The lightwave (1) is coupled to a polarization maintaining optical coupler (PM OC, 2), having a 50%:50% coupling ratio. After this PM OC 2, the lightwave is divided into two parts. Each part is modulated by a dual-arm modulator (3 and 4). Each dual-arm Mach-Zehnder modulator (3,4) is used to generate a 4ASK (amplitude shift keying) optical signal. The DC for this modulator (3,4) is biased at the quadrature point. Each modulator (3,4) is driven by independent data I1($t$) and I2($t$) or Q1($t$) and Q2($t$). Where the amplitude meets: I2=I1/2 or I1=I2/2; Q2=Q1/2 or Q1=Q2/2. But I2+I1 should be smaller than the half-wave voltage of the external modulator. For 100 Gb/s16QAM signal generation, the bit rate for I1, I2, Q1 and Q2 has to be 25 Gbit/s. I1($t$) and I2($t$) or Q1($t$) and Q2($t$) should be synchronized.

A phase modulator (5) is connected the lower dual arm modulator 4 driven by the Q1($t$) and Q2($t$) data signals. This phase modulator 5 is used to generate a 90 degree phase shift or optical ray length with approximately ~1550/4 nm if the wavelength of the lightwave is 1550 nm. Alternatively, a regular phase shifter can also be used to provide the required phase shift. Then the two parts are combined by another polarization maintaining optical coupler PM OC 6. The dual arm modulators 3, 4 and phase shifter 5 should be polarization maintaining components, and also the fiber interconnecting them is polarization maintaining. Otherwise, a polarization controller is necessary. The output from the polarization combining coupler 6 is a 16QAM optical signal that can be sent over a transmission fiber 7 to a distant receiver Rx.

Figure 2:
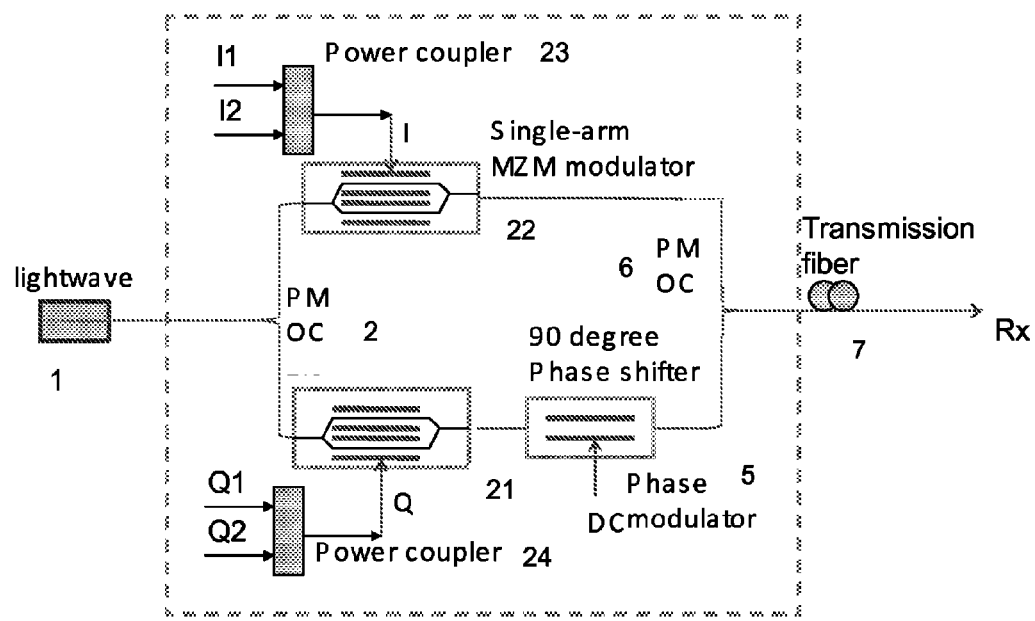
FIG. 2 is schematic diagram of a transmitter generating a 16QAM optical, employing single arm modulators, in accordance with the invention.

FIG. 2 is schematic diagram of a transmitter generating a 16QAM optical, employing single arm modulators, in accordance with the invention. The configuration of FIG. 2 is similar to the architecture of FIG. 1, except two single arm modulators 21, 22 replace the two dual-arm modulators 3,4. The single arm modulator 21, 22 is still biased at quadrature point. But, the driven electrical signal to the single arm modulator is a 4ASK electrical signal. This 4ASK electrical signal can be generated by combining the I1 and I2 or Q1 and Q2 through respective power couplers 23, 24. The I1, I2, Q1 and Q2 should be the same as those described for the configuration of FIG. 1.

For the embodiments of FIG. 1 and FIG. 2, the modulators 3, 4, 21, 22, the phase shifter 5 and polarization maintaining couplers 2, 6 can be integrated in one device by waveguide or other planar lightwave circuit PLC techniques. Alternatively the integration of these components can be a nested (integrated) modulator. In FIG. 2, the modulators 21, 22, the phase shifter 5 and PM couplers 2, 6 can be replaced by a standard QPSK modulator.

Referring to both FIG. 1 and FIG. 2, the lightwave source 1 can be an LED, DFB-LED, FP-LD or tunable external laser. An LED source is the lowest relative cost source with a very wide spectrum and is suitable for less than 1 km transmission distances. The distributed feedback laser diode DFB-LD has a narrow line width, is suitable for long distance transmissions, but is relatively expensive. The Fabry-Perot laser diode FP-Ld is a relatively cheaper alternative light source that is suitable or smaller than 10 km transmission distances, but exhibits a wide line width. The tunable external laser is a relatively expensive light source, exhibits a narrow line width, low phase noise and is preferred for coherent detection in a high speed system.

The modulators shown, (dual arm 3, 4, and single arm 21, 22) can be a LiNbO3 Mach-Zehnder modulator, which has a high extinction ratio, but requires a high driven voltage, or a InP Mach-Zehnder modulator which is relatively small in size, requires a low driven voltage and has a low extinction ratio.

The phase shifter 5 is preferably a LiNbO3 waveguide or other nonlinear media, small in size and easily fabricated by integrated circuit techniques, to generate 90 degree phase shifter or approximately a 1550/4 nm optical ray length if the wavelength of lightwave is 1550 nm. The time delay is realized by changing the nonlinear coefficient of the medium. Alternatively, a manual or programming optical time delay technique, large in size and easily manufactured, can be used to generate a 90 degree phase shift by changing the optical length by any method.

The polarization maintaining optical coupler PM-OC 2, 6 can be implemented straightforward by a PM-OC which is of relatively large size and easily manufactured or a waveguide which is of relatively small size and can be implemented with integrated circuit techniques. The power combiner 23, 24 is used to combine binary phase shift keying BPSK electrical signals. The data signals I1, I2, Q1 and Q2 are electrical BPSK signals. The I1 voltage is half of the I2 voltage, and the Q1 voltage is half of Q2 voltage. The I1 and I2 or Q1 and Q2 signals should be synchronized in the time domain.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. An optical transmitter comprising:
   a dividing optical coupler for dividing a lightwave onto optical paths;
   a first optical modulator in a first of the optical paths and driven by an I component of a first signal and a I component of a second signal for modulating the lightwave, a DC bias of the first optical modulator being at a quadrature point;
   a second optical modulator in a second of the optical paths and driven by a Q component of the first signal and a Q component of the second signal for modulating the lightwave, a DC bias of the second optical modulator being at the quadrature point;
   a phase shifter for generating a 90 degree phase shift in the Q components of the first and second signals that are modulated by the second optical modulator; and
   a combining optical coupler for combining the modulated lightwave from the first optical coupler and the phase shifted Q components of the first and second signals for generating a quadrature amplitude modulated signal;
   wherein the phase shifter generates an optical ray length of approximately one quarter of 1550 nm if the lightwave has a wavelength of near 1550 nm.

2. The optical transmitter according to claim 1, wherein voltage value of the I components of the first and second signals is smaller than a half wave voltage of its respective optical modulator.

3. The optical transmitter according to claim 1, wherein for 100 Gbit/s 16QAM signal generation out of the combining optical coupler the bit rate for the I and Q components each is 25 Gbit/s.

4. The optical transmitter according to claim 1, wherein at least one of the I components the Q components are synchronized in a time domain.

5. The optical transmitter according to claim 1, wherein the modulators are dual arm modulators being one of a LiNbO3 mach-Zehnder modulator and a InP mach-Zehnder modulator.

6. A method for generating an optical signal comprising the steps of:
   dividing a lightwave onto optical paths;
   modulating the lightwave on a first of the optical paths responsive to an I component of a first signal and a I component of a second signal, a DC biasing of the modulating of the I components being at a quadrature point;
   modulating the lightwave on a second of the optical paths responsive to a Q component of the first signal and a Q component of the second signal, a DC biasing of the Q components being at the quadrature point;
   generating a 90 degree phase shift in the modulated Q components; and
   combining the modulated I components and the phase shifted Q components for generating a quadrature amplitude modulated signal;
   wherein the generating step generates an optical ray length of approximately one quarter of 1550 nm if the lightwave divided onto the optical paths has a wavelength of nearly 1550 nm.

7. The method according to claim 6, wherein a voltage value of the I components of the first and second signals is smaller than a half wave voltage of its respective optical modulator.

8. The method according to claim 6, wherein for 100 Gbit/s 16QAM signal generation out of the combining step the bit rate for the I and Q components each is 25 Gbit/s.

9. The method according to claim 6, wherein at least one of the I components the Q components are synchronized in a time domain.

10. The method according to claim 6, wherein the modulating steps are carried out by dual arm modulators being one of a LiNbO3 mach-Zehnder modulator and a InP mach-Zehnder modulator.

* * * * *